United States Patent
Tsuboi et al.

(10) Patent No.: US 7,719,621 B2
(45) Date of Patent: May 18, 2010

(54) IMAGE DISPLAY DEVICE AND METHOD HAVING IMAGE CONTROL UNIT PREVENTING LIGHT SOURCE UNIT FROM OUTPUTTING AN IMAGE WHEN OBSERVER IS OUTSIDE OF PREDEFINED NORMAL VIEWING AREA

(75) Inventors: Masashi Tsuboi, Yokosuka (JP); Tsutomu Horikoshi, Kamakura (JP); Mikiko Nakanishi, Yokosuka (JP); Yasuhiro Takagi, Fuchu (JP)

(73) Assignee: NTT DoCoMo, Inc., Tokyo (JP)

( * ) Notice: Subject to any disclaimer, the term of this patent is extended or adjusted under 35 U.S.C. 154(b) by 357 days.

(21) Appl. No.: 11/773,203

(22) Filed: Jul. 3, 2007

(65) Prior Publication Data
US 2008/0007511 A1 Jan. 10, 2008

(30) Foreign Application Priority Data
Jul. 5, 2006 (JP) ............................ P2006-185930

(51) Int. Cl.
*G02F 1/1335* (2006.01)
(52) U.S. Cl. .......................................... 349/15; 348/51
(58) Field of Classification Search ................... 349/15; 348/42–60
See application file for complete search history.

(56) References Cited

U.S. PATENT DOCUMENTS

| | | | |
|---|---|---|---|
| 4,987,487 A | | 1/1991 | Ichinose et al. |
| 5,945,965 A | * | 8/1999 | Inoguchi et al. .................. 345/6 |
| 6,055,013 A | * | 4/2000 | Woodgate et al. ............. 348/59 |
| 2001/0010565 A1 | * | 8/2001 | Chikazawa ................... 349/15 |
| 2004/0233275 A1 | * | 11/2004 | Tomita .......................... 348/51 |
| 2006/0209371 A1 | | 9/2006 | Hamagishi |

FOREIGN PATENT DOCUMENTS

EP 0 354 851 A2 2/1990

(Continued)

OTHER PUBLICATIONS

Ian Sexton, et al. "Stereoscopic and Autostereoscopic Display Systems", IEEE Signal Processing Magazine, May 1999, pp. 85-99.

(Continued)

*Primary Examiner*—John Heyman
(74) *Attorney, Agent, or Firm*—Oblon, Spivak, McClelland, Maier & Neustadt, L.L.P.

(57) ABSTRACT

It is an object of the present invention to display unnaturalness-free images without showing an observer repetitive images in accordance with the observer's viewpoint.

A light beam control element 101b limits a viewing area of images composed of light emitted from a light source array 101a. Here, a terminal position detection sensor 102 or an observer position detection sensor 103 detects a relative positional relationship between the observer's eye observing the image formed by the light emitted from the light source array 101a, and the light source array 101a and the light beam control element 101b. Based on the positional relationship detected by these sensors, a display image control device 104 controls the light source array 101a so as to change display contents of the light forming the image with the viewing area limited by the light beam control element 101b.

17 Claims, 15 Drawing Sheets

FOREIGN PATENT DOCUMENTS

| | | |
|---|---|---|
| EP | 0 576 106 A1 | 12/1993 |
| EP | 0 726 482 A2 | 8/1996 |
| EP | 0 752 609 A2 | 1/1997 |
| JP | 6-059197 | 3/1994 |
| JP | 7-270745 | 10/1995 |
| JP | 10-115801 | 5/1998 |
| JP | 2001-275134 | 10/2001 |
| JP | 3318680 | 6/2002 |
| JP | 2002-296540 | 10/2002 |
| JP | 2005-309374 | 11/2005 |
| KR | 72694 | 10/1993 |
| KR | 10-2006-0101298 | 9/2006 |

OTHER PUBLICATIONS

Ken Perlin, et al., "An Autostereoscopic Display", Media Research Laboratory, Dept. of Computer Science, 2000, 8 pages.

\* cited by examiner

IMAGE DISPLAY DEVICE AND METHOD HAVING IMAGE CONTROL UNIT PREVENTING LIGHT SOURCE UNIT FROM OUTPUTTING AN IMAGE WHEN OBSERVER IS OUTSIDE OF PREDEFINED NORMAL VIEWING AREA

BACKGROUND OF THE INVENTION

1. Field of the Invention

The present invention relates to an image display device and an image display method for displaying an image with the image being changed according to an observer's viewing direction.

2. Related Background of the Invention

There is known a display technique of images for controlling a light source which is visible from an observer by disposing a shielding such as a parallax barrier, or an optical element such as a lenticular sheet or a lens array in front of a light source array such as a liquid crystal display. The display technique produces parallax since the observed image varies according to the position of the observer. Since the technique realizes binocular parallax when both eyes are used for observation, it is applied to a three dimensional (3D) display, as well as an image display device which can provide different images to be observed for respective observers, for example, when the same display is observed from a driver's seat and a passenger's seat in a car.

FIG. 1 illustrates an exemplary display using a parallax barrier, and FIG. 2 illustrates an exemplary display using a lenticular sheet. In FIGS. 1 and 2, the display includes a light source array (light sources 1 to 8), the light source array corresponding to each pixel of the liquid crystal display, for example. FIGS. 1 and 2 show that light emitted from the light sources 1, 3 and 5 is visible from respective directions of the corresponding arrows. Although other light sources are not illustrated, they are similarly visible from the respective corresponding angular directions. In any of the techniques, an area in which each light source array is visible is limited, thereby allowing a three-dimensional image to be displayed by producing binocular parallax. The display shown in FIGS. 1 and 2 is an example of a four-view display, however a stereo display (two-view) and a multi-view display for displaying multi-view images are similar in principle.

There is also a method which allows different images to be visible according to the viewing position, when seen from above, beneath, right, or left, by replacing the lenticular sheet of FIG. 2 with a microlens array and controlling the direction of the light emitted from the light source similarly along the vertical direction, which is referred to as integral photography (IP).

When displaying different images according to the observation position by placing, in front of the light source array (output plane of the light source), for example, a parallax barrier 10 having periodically repetitive slits, or a light beam control element such as a lenticular sheet 11 or a lens array to produce parallax, the above-mentioned light beam control element controls the observer's viewing area for several light source arrays to realize multi-view (including two-view, i.e., stereo vision) display. For example, in the case of a four-view display, a slit or a cylindrical lens constituting the lenticular sheet is provided for four light sources (i.e., four pixels), and the slits or the cylindrical lenses control the area in which the observer can view the light emitted from the light source.

A set of the four light sources, when used as a 3D display which is a fundamental application of these devices, is referred to as a 3D pixel, since the set is a minimal unit of a 3D image when displaying the 3D image. With the conventional method using a parallax barrier, a lenticular sheet, or a lens array, there exists an area for each of the 3D pixels in which a 3D image can be normally observed.

FIG. 3 is an explanatory view illustrating the area in which a 3D image can be observed when a lenticular sheet is used. As shown in FIG. 3, the output direction of the light is changed by the action of the cylindrical lens constituting the lenticular sheet 11 for the 3D pixels (light sources 5 to 8), so that an area in which the light is visible, i.e., viewing area is produced. In addition, the parallax barrier method is similar in principle, except that the disposed lenticular sheet is an element for periodically providing a shield and an opening in repetition (see FIG. 1).

Also with the IP method, although the shape of the cross section is similar to that of FIG. 3, the cross section is similar along the vertical direction, since the light beam control element is not a lenticular sheet but a lens array, and thereby the 3D pixel b is formed by a set of light sources which are two-dimensionally disposed. FIG. 4 is an explanatory view illustrating a case using a nine-view IP method composed of a vertically three-parallax 3D pixel b1 and a horizontally three-parallax 3D pixel b2. With regard to the arrows indicating the viewing direction of the light source, only those corresponding to three vertical parallaxes in the middle are shown in FIG. 4. However, the lenticular sheet 11 which is the light beam control element similarly controls the parallaxes along nine directions vertically and horizontally.

As stated above, the techniques of varying the image to be displayed according to position of the observer include, for example, patent literature 1 (Japanese Patent Application No. 7-270745) and patent literature 2 (Japanese Patent Application Laid-Open No. 2002-296540). The techniques described in patent literatures 1 and 2 relate to a 3D image display device, wherein 3D images can be displayed by displaying pixels for the left eye and pixels for the right eye, and images according to the position of the observer can be displayed by turning the barrier on and off.

[Patent Literature 1] Japanese Patent Application Laid-Open No. 7-270745

[Patent Literature 2] Japanese Patent Application Laid-Open No. 2002-296540

SUMMARY OF THE INVENTION

Here, for all of the 3D pixels, although, when the observer (the observer's both eyes, to be precise) is inside the above-mentioned viewing area (see FIG. 3 or FIG. 4), an 3D image is observed correctly, there is a case in which, when the observer is at a position outside the viewing area, light from a light source which is originally not designed to be observed at the position happens to be visible. This is referred to as "repetitive image". FIG. 5 shows a situation in which a repetitive image is visible in the case of the lenticular method. The light sources 1 to 4 in FIG. 5 compose the 3D pixel a, while the light sources 5 to 8 compose 3D pixel b. As indicated in FIG. 5, when the observer observes from outside of the original viewing area of 3D pixel a, an image provided by the light source 5 can be viewed in a direction which is not originally intended. With a conventional 3D display, it may happen that the 3D image displayed according to the position of the observer looks unnatural due to presence of the repetitive images, limiting the viewing area in which the image can be observed. In addition, even if a 3D display is not used, there has been a problem that, when displaying a plurality of viewpoint images, an already viewed image happens to be seen again likewise as the observer moves his/her viewpoint position, causing the observer to feel unnatural.

This problem is similar with the techniques described in both the above-mentioned patent literatures 1 and 2. Furthermore, with the techniques described in both of the above-mentioned patent literatures 1 and 2, there is a problem that the screen flickers due to movement of the barrier and ON/OFF of the switch of the polarizing plate for switching displays, when the position of the observer continuously varies.

Thus, in order to solve the above-mentioned problem, it is an object of the present invention to provide an image display device and an image display method which can display unnaturalness-free images without showing the observer repetitive images according to the observer's viewpoint.

In order to solve the above-mentioned problem, an image display device of the present invention comprises a light source unit having light sources for emitting light corresponding to a plurality of pixels composing an image to be displayed; a light beam control unit for limiting a viewing area of the image formed by the light emitted from the light source unit; a detection unit for detecting a relative positional relationship between an observer's eye observing the image formed by the light emitted from the light source unit, and the light source unit and the light beam control unit; and an image control unit for controlling, in accordance with the positional relationship detected by the detection unit, the light source unit to change display contents of the light forming the image with the viewing area limited by the light beam control unit.

In addition, an image display method of the present invention is an image display method of the image display device that comprises: a light source unit having light sources for emitting light corresponding to a plurality of pixels composing an image to be displayed, and a light beam control unit for limiting a viewing area of the image formed by the light emitted from the light source unit, the method comprising: a detection step of detecting a relative positional relationship between an observer's eye observing the image formed by the light emitted from the light source unit, and the light source unit and the light beam control unit; and an image control step of controlling, in accordance with the positional relationship detected by the detection step, the light source unit to change display contents of the light forming the image with the viewing area limited by the light beam control unit.

According to the above arrangement, it is possible to limit the viewing area of the image formed by the light emitted from the light source; detect a relative positional relationship between the observer's eye observing the image formed by the light emitted from the light source unit and the light source; and, in accordance with the detected positional relationship, change display contents of the light composing the image with limited viewing area. This allows displaying unnaturalness-free images without showing the observer repetitive images according to the observer's viewpoint.

In addition, it is preferred that the light source unit of the image display device of the present invention display images using a light source array. With this arrangement, images can be displayed using the light source array.

In addition, it is preferred that the light beam control unit of the image display device of the present invention be a lenticular sheet having cylindrical lenses consecutively arranged thereon.

In addition, it is preferred that the light beam control unit of the image display device of the present invention be a parallax barrier having vertical slits periodically arranged thereon.

In addition, it is preferred that the light beam control unit of the image display device of the present invention be a liquid crystal lens or a holographic optical element which can electrically control refractive index and amplitude transmittance.

In addition, it is preferred that the light beam control unit of the image display device of the present invention be a lens array of two-dimensionally arranged lenses.

In addition, it is preferred that the detection unit of the image display device of the present invention detect at least one of the position of the display unit including the light source unit, the inclination of the display unit with respect to the observer's gaze direction (line-of-sight direction), and the position of the eyes and the gaze direction of the observer observing the image displayed by the display unit.

With the above arrangement, it is possible to detect the relative positional relationship between the observer and the displayed image by detecting at least one of: the position of the light source and its inclination with respect to the observer's line of sight; or the eye position and line of sight direction the observer observing the displayed image.

In addition, it is preferred that the image control unit of the image display device of the present invention control the light source unit, when the observer is located at a position other than a predefined normal viewing area in which an image formed by the light emitted from one light source of the light source unit is visible, so that the light source unit does not output, from the light emitted from the one light source of the light source unit, an image corresponding to the position within the normal viewing area, if the detection unit determines that the observer is located at a position within a repetitive area in which an image formed by the light emitted from the one light source of the light source unit is visible.

With the above arrangement, when the observer is located at a position other than a predefined normal viewing area, it is possible to prevent outputting, from the one light source, an image corresponding to the position within the normal viewing area, if it is determined that the observer is located at a position within a repetitive area. In this manner, unnaturalness-free images can be displayed without showing the observer a repetitive image according to the observer's viewpoint.

In addition, it is preferred that the image control unit of the image display device of the present invention control the light source unit, if the detection unit detects that the observer is located within a shielded area in which light emitted from the one light source is not visible, so that the light source unit does not output an image being emitted from the light source unit to the normal viewing area.

With the above arrangement, if it is detected that the observer is located at a position within a shielded area, it is possible to prevent outputting, from one light source, an image corresponding to the position within the normal viewing area, assuring that repetitive images are not shown to the observer according to the observer's viewpoint, by preliminarily preventing output of the images.

In addition, it is preferred that the image control unit of the image display device of the present invention control the light source unit, if the detection unit detects that the observer is located at a position within the repetitive area for the one light source, so that the light source unit emits light from the one light source to complement the image formed by the light emitted from other light sources having the position as the normal viewing area.

With the above arrangement, if it is detected that the observer is located within the repetitive area, it is possible to cause light to be emitted from one light source to complement the image formed by the light from other light sources of the above-mentioned light source unit. In this manner, unnaturalness-free images can be shown, as well as increasing the images visible to the observer so that the observer is provided with images which are easier to view.

The present invention can display unnaturalness-free images without showing the observer repetitive images according to the observer's viewpoint.

DESCRIPTION OF THE PREFERRED EMBODIMENTS

The present invention should be readily understood by considering the following detailed description, referring to the accompanying drawings shown for an embodiment. Subsequently, an embodiment of the present invention will be described referring to the accompanying drawings. Whenever possible, identical members are provided with identical numerals and symbols, whereby omitting duplicate description.

First Embodiment

Figure 1:
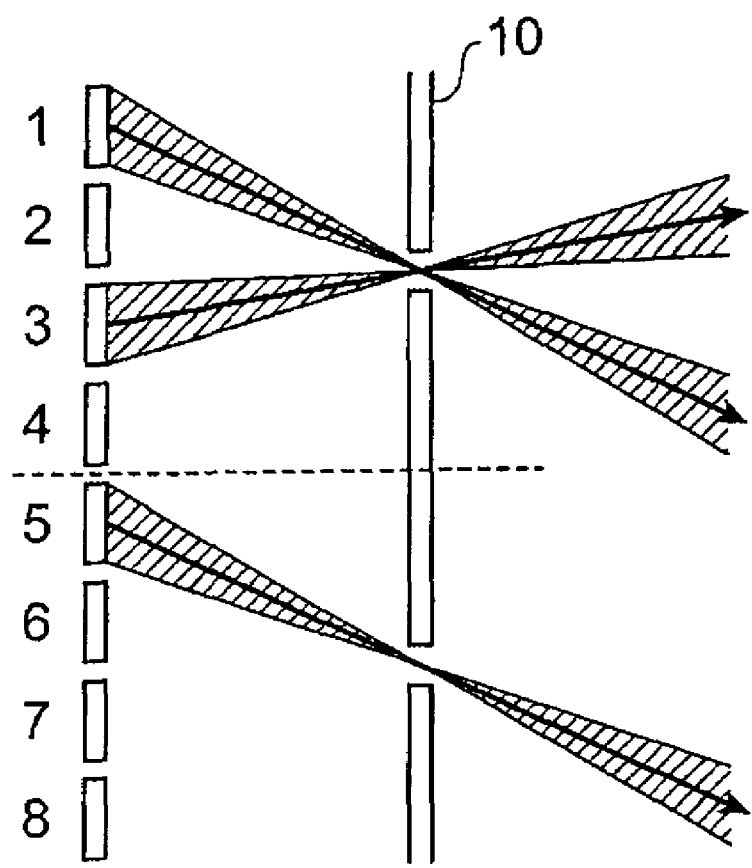
FIG. 1 is a block diagram illustrating an arrangement of a display using a parallax barrier.
Figure 2:
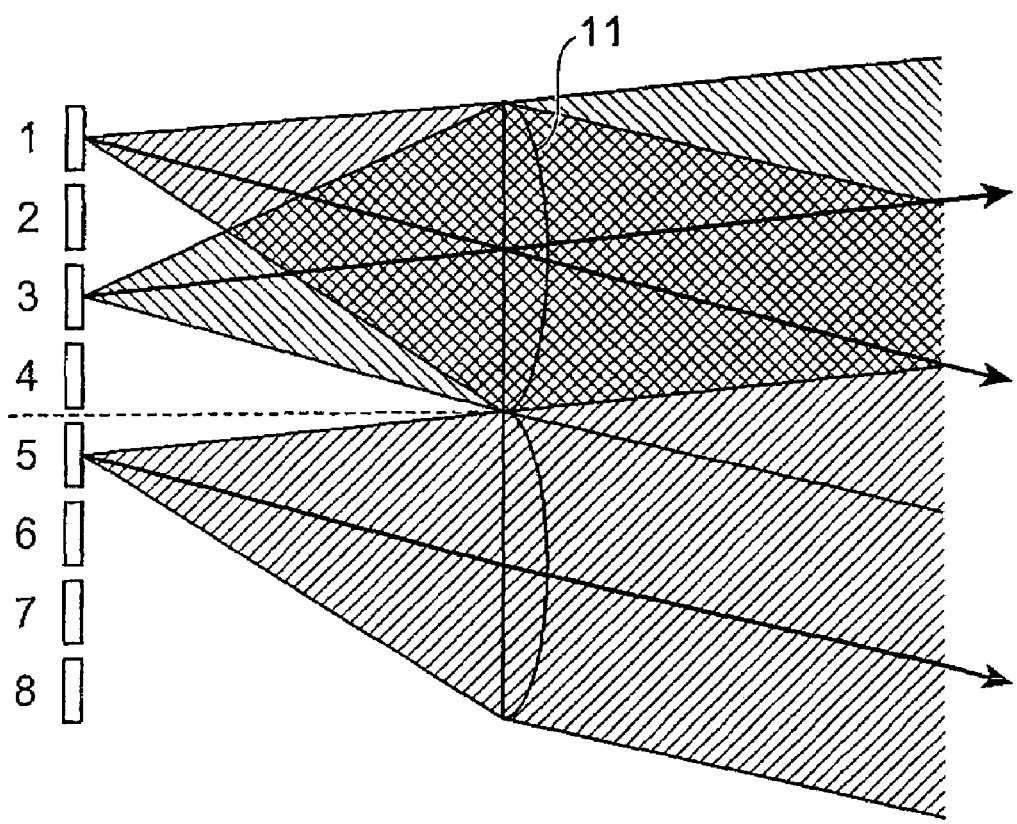
FIG. 2 is a block diagram illustrating an arrangement of a display using a lenticular sheet.
Figure 3:
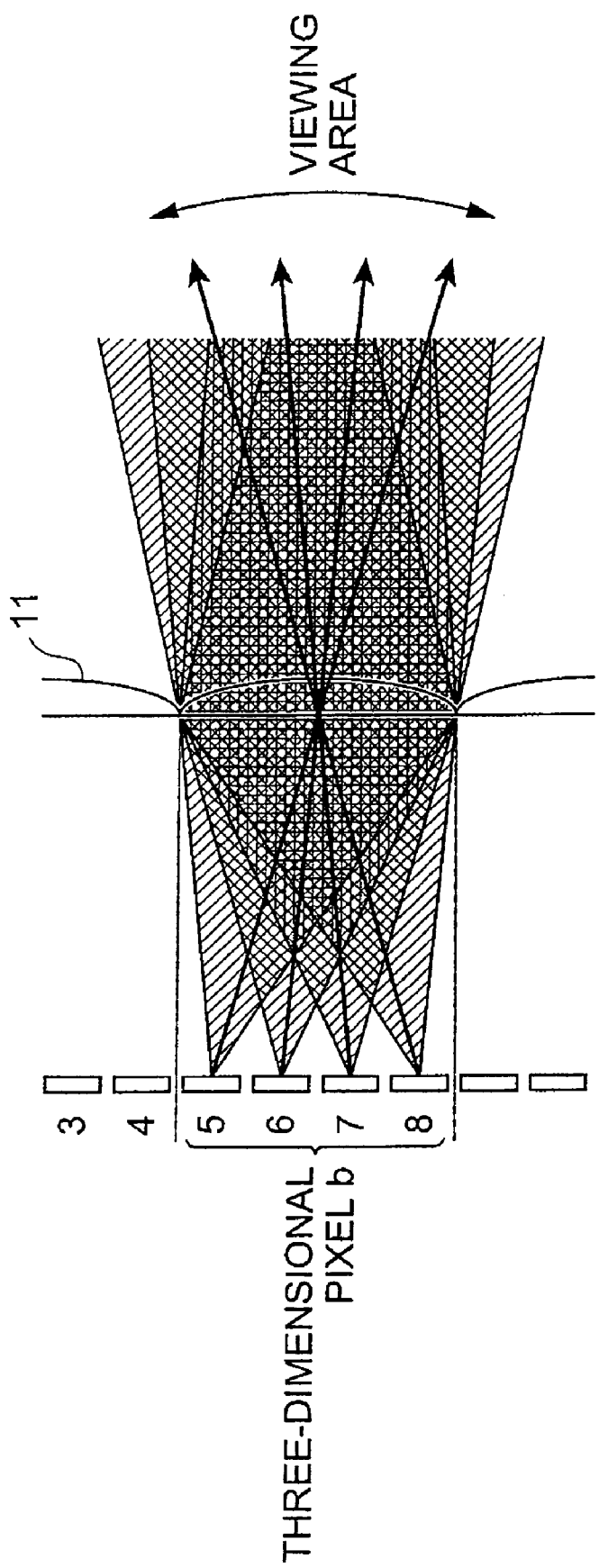
FIG. 3 is an explanatory drawing of a viewing area in the display using the lenticular sheet.
Figure 4:
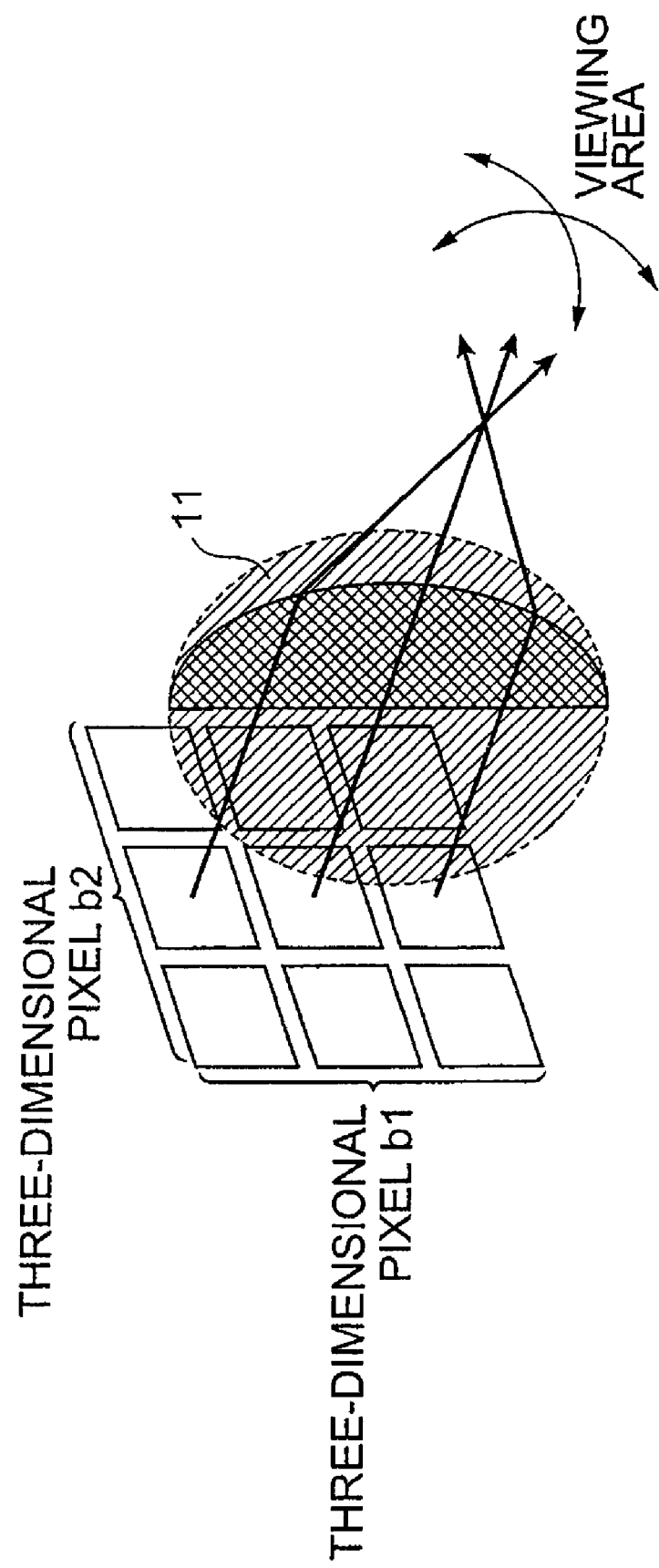
FIG. 4 is an explanatory drawing of the viewing area in a display using an IP method.
Figure 5:
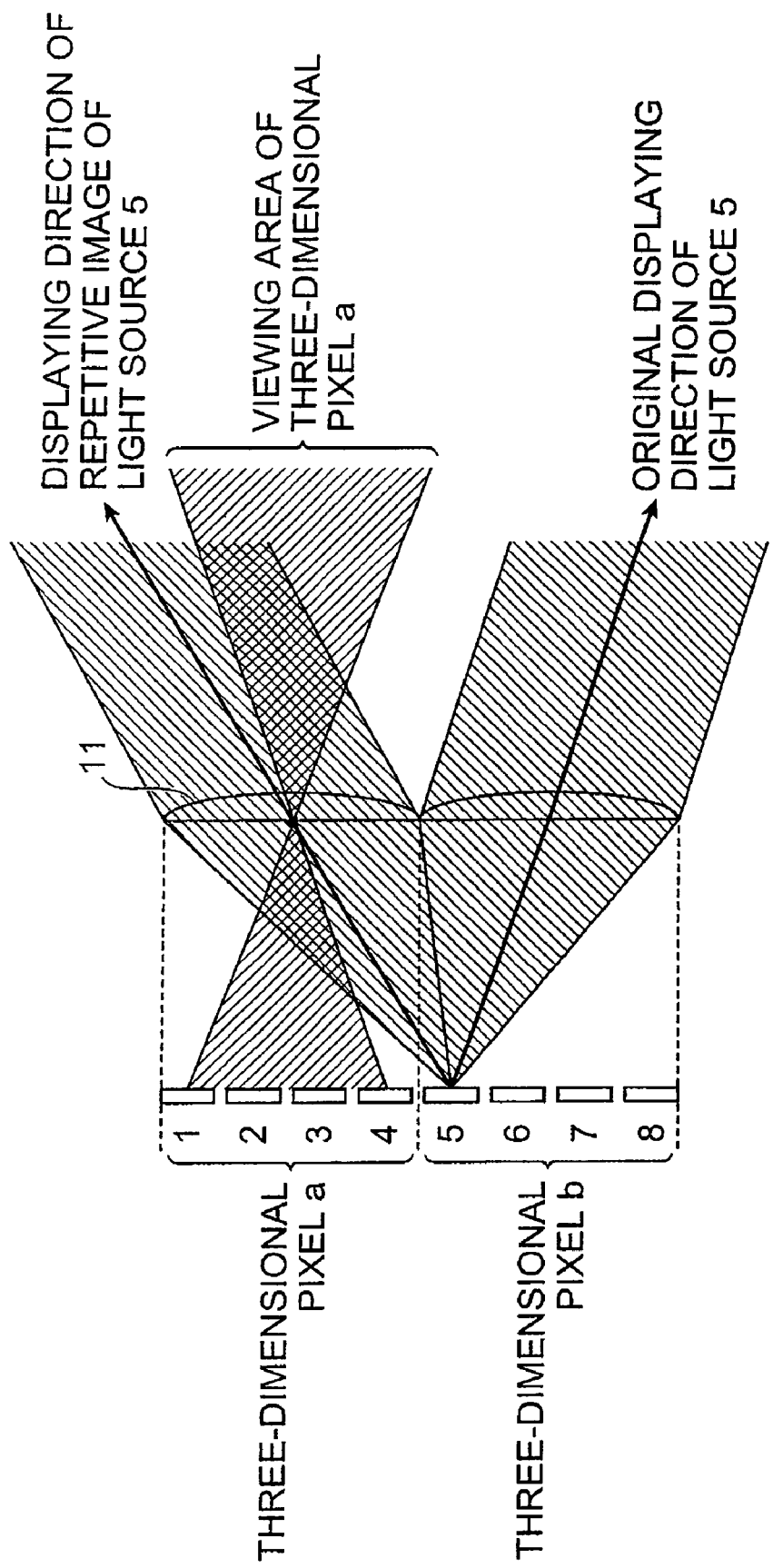
FIG. 5 is an explanatory drawing of a principle of how a repetitive image is generated on the display using the lenticular sheet.
Figure 6:
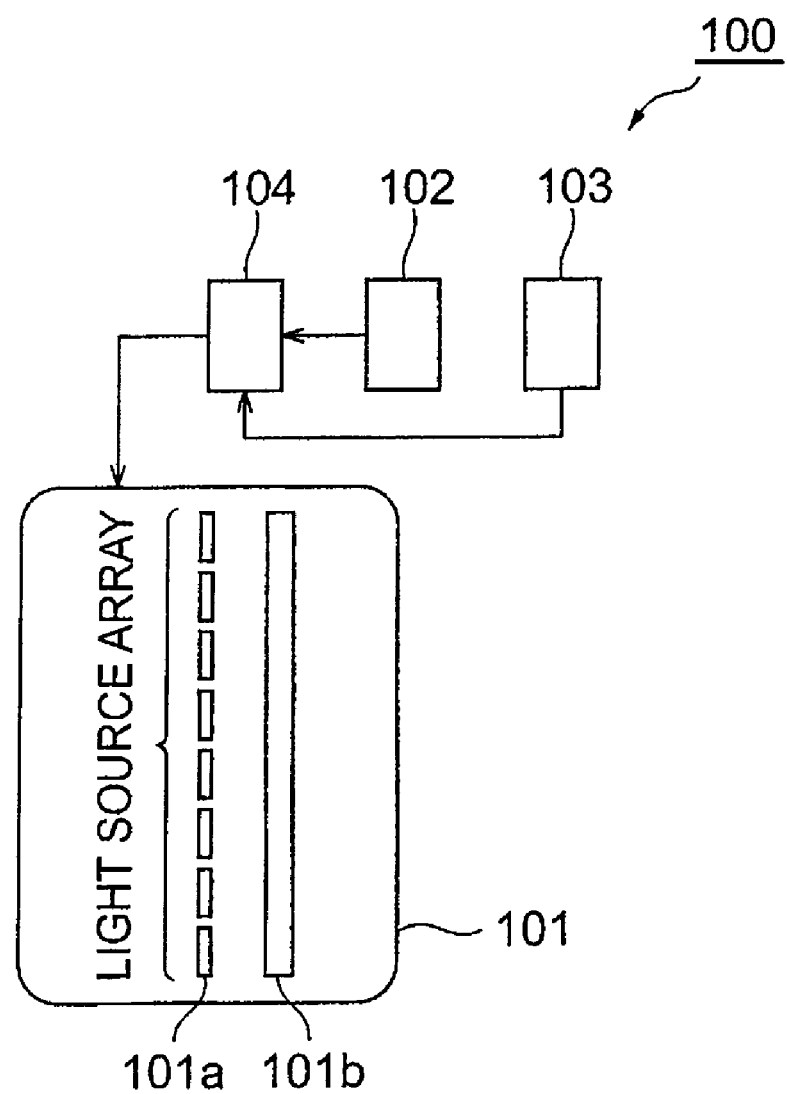
FIG. 6 is a block diagram illustrating an arrangement of an image display device of the first embodiment.

The image display device according to the first embodiment comprises, as shown in FIG. 6, a display 101 (including a light source array 101a (light source unit), a light beam control element 101b (light beam control unit)), a terminal position detection sensor 102 (detection unit), an observer position detection sensor 103 (detection unit), and a display image control device 104 (image control unit).

The display 101 includes a light source array 101a, and a light beam control element 101b.

The light source array 101a is a light source of light which forms multi-view images and outputs a plurality of images in pixel units. The light source array 101a may be respective pixels of the liquid crystal display, or may be luminous bodies such as LEDs being disposed.

The light beam control element 101b is provided on the display surface side of the light source array 101a so that it can limit the position at which each of the light sources composing the light source array 101a is visible. For example, the light beam control element 101b may be a parallax barrier which shields the light output from the light source array 101a, a lenticular sheet which is an optical element such as a cylindrical lens for controlling the direction of light beam, or an optical element such as a liquid crystal lens or a holographic optical element (HOE) for electrically controlling refractive index and amplitude transmittance.

The terminal position detection sensor 102 is a sensor for detecting at least one of, the position, direction, and inclination of the display 101. The terminal position detection sensor 102 may be an inclination sensor or an acceleration sensor attached to the display 101, or may be an infrared sensor, an ultrasonic sensor or a camera (imaging device). In addition, these sensors may be provided in external environment to detect the position, direction, or inclination of the display 101. The terminal position detection sensor 102 composed of these sensors can detect the position, direction, or inclination in the space in which the display 101 exists. The position of the display detected by the terminal position detection sensor 102 is virtually specified by three axes x, y, and z in the space, the terminal position detection sensor 102 being capable of detecting the point along the coordinate axes on which the display 101 exists and detecting the direction toward which the display 101 is facing.

Specifically, the terminal position detection sensor 102 can determine the position and inclination of the display 101 in the space by detecting, among the parts composing the display 101, three or more different parts and their positions. Similarly, the terminal position detection sensor 102 can determine the position and inclination of the display 101 in the space by detecting one of the parts composing the display 101 and the angle of inclination of the display 101 itself to the three axes. As the sensors for estimating the position of the display 101, those such as the above-mentioned inclination sensor, the acceleration sensor, the infrared sensor, the ultrasonic sensor or the camera can be used. The inclination sensor or the acceleration sensor can detect the inclination angle to the three axes, the angular velocity, the angular acceleration, the transfer speed, and the acceleration, and convert the detected information into the position or the inclination angle to the three axes of the display 101.

In addition, when, an infrared or ultrasonic sensor is used, the infrared or ultrasonic sensor can generate infrared light or ultrasonic wave toward the display 101, receive the reflection, and estimate the position of the display 101. In addition, an infrared light/ultrasonic wave generator provided on the display 101 can generate infrared light or ultrasonic wave toward external environment and estimate the position of the display 101 by receiving the reflection. In addition, when a camera is used as the terminal position detection sensor 102, the position and inclination of the display 101 can be estimated from camera images. In this case, the position or inclination of the display 101 may be estimated by disposing markers or the like in the external environment or on the display 101 itself as feature points, or by extracting feature points by image processing.

As enumerated above, the sensor or camera as the terminal position detection sensor 102 may be used in combination of two or more types of devices, or may be used in combination of a plurality of identical sensors. When using these sensors in combination, reliability of operation can be enhanced by using information from individual sensors. For example, devices such as a camera may be greatly affected by brightness in the external environment, and however the inclination sensor or the like will not be affected by brightness. On the other hand, inclination sensors have a lower precision due to accumulated errors because they usually evaluate variation of inclination amount relative to the initial state, and due to the fact that they do not directly detect the observer's position. Therefore, it is preferred that both the camera and inclination sensor be used in combination, whereby suppressing the above-mentioned shortcoming during operation.

The observer position detection sensor 103 is a sensor for detecting the observer's position. Here, the observer's position may be a relative position with respect to the display 101, or a coordinate value relative to three virtual axes x, y and z defined in the space. The observer position detection sensor 103 may be an acceleration sensor, an infrared sensor, an ultrasonic sensor or a camera carried by the observer, or may be an infrared sensor, an ultrasonic sensor or camera provided on the display 101, or may be an infrared sensor, an ultrasonic sensor or a camera provided in the external environment. As the observer's position, although it is ideal that the positions of both eyes of the observer can be estimated, a representative site such as the position of the observer's face may be used instead.

When using an acceleration sensor, an infrared sensor, an ultrasonic sensor or a camera carried by the observer as the observer position detection sensor 103, and when providing these sensors in the external environment, a similar process as with the terminal position detection sensor 102 can be executed to estimate the observer's position. In addition, when providing these sensors and the camera on the display 101 for estimating the observer's position, obtainable information will be that indicating the relative position to the display 101. Here, when using an imaging device such as a camera to photograph the observer himself and estimate the observer's position, it is also possible to estimate the observer's position using, in addition to the markers used for detecting the terminal position, a technique of detecting/recognizing the face from an image. Similarly with the terminal position detection sensor, the sensors and camera mentioned above may be used in combination of two or more types, or a plurality of devices of an identical type. When used in combination, reliability of operation can be enhanced by using information from individual sensors.

The display image control device 104 can calculate the relative positional relationship between the display 101 and the observer based on the position of the display 101 and the observer's position detected by the terminal position detection sensor 102 and the observer position detection sensor 103, and control to change images to be displayed by the light source array 101a based on the positional relationship. Details of the control to change images to be displayed will be described below.

The principle of the image display device thus composed and its operation based on the principle will be described as follows.

Figure 7:
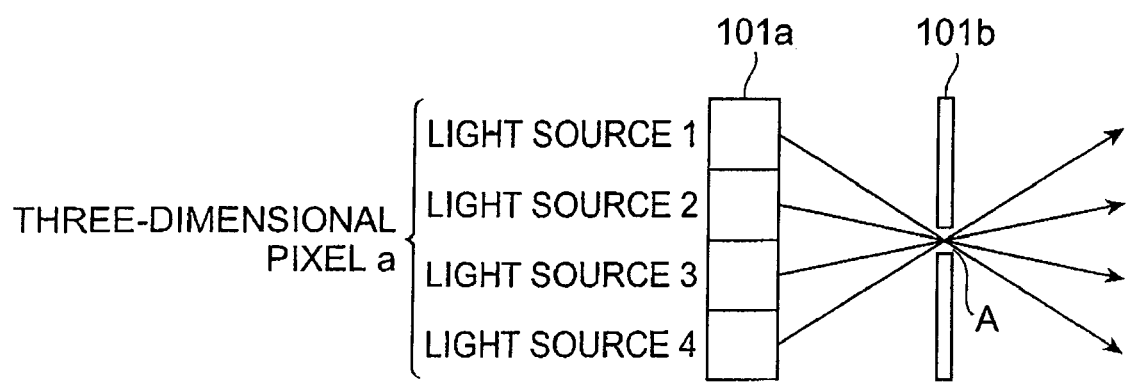
FIG. 7 is an explanatory drawing of a line of sight on the display using a parallax barrier.

As stated above, the image display device capable of displaying multi-view images is constituted by combining the light source array 101a and the light beam control element 101b provided on its display surface side to constitute the display 101. The light source array 101a is typically provided in a two-dimensional space so that multi-view images can be displayed for the observer, with the light beam control element 101b limiting the range in which the observer can observe the light emitted from these light sources. A conceptual diagram illustrating the principle of displaying multi-view images is shown in FIG. 7. Here, in FIG. 7, although the light beam control element 101b is a barrier (a parallax barrier) formed by periodically placing shieldings and openings, a lenticular sheet formed by periodically disposing cylindrical lenses.

FIG. 7 is an explanatory drawing illustrating the relationship between the light source and the viewing area when a parallax barrier is employed as the light beam control element 101b, wherein the arrangement is similar to a conventional four-view display, providing similar functionality. When seen as a conventional four-view 3D display, a 3D pixel a is composed of light sources 1 to 4. The 3D pixel a, composed of the light sources 1 to 4, is under control of the display image control device 104 to display, toward the direction indicated by the arrows shown in FIG. 7, respectively, view-dependent images which are suited for respective directions. In other words, it is controlled by the light beam control unit so that the displayed images look different according to the line of sight (gaze direction)). In addition, the present embodiment can be embodied in similar manner when seen not as a 3D display but as a display for displaying four different images according to the observer's position.

As shown in FIG. 7, the observer can observe the light (image) output from the light source array 101a through a slit A. Then, a multi-view image can be displayed for the observer because visible light sources 1 to 4 are different according to the position of the observer (or his/her eye balls, to be more precise), and it becomes possible to display a 3D image by controlling so that different light sources are visible to both eyes. Actually, the observer can not view these images correctly in all of the areas, since there is a limitation in the range in which the observer can view respective light sources 1 to 4, description of which will be given below referring to FIG. 8.

Figure 8:
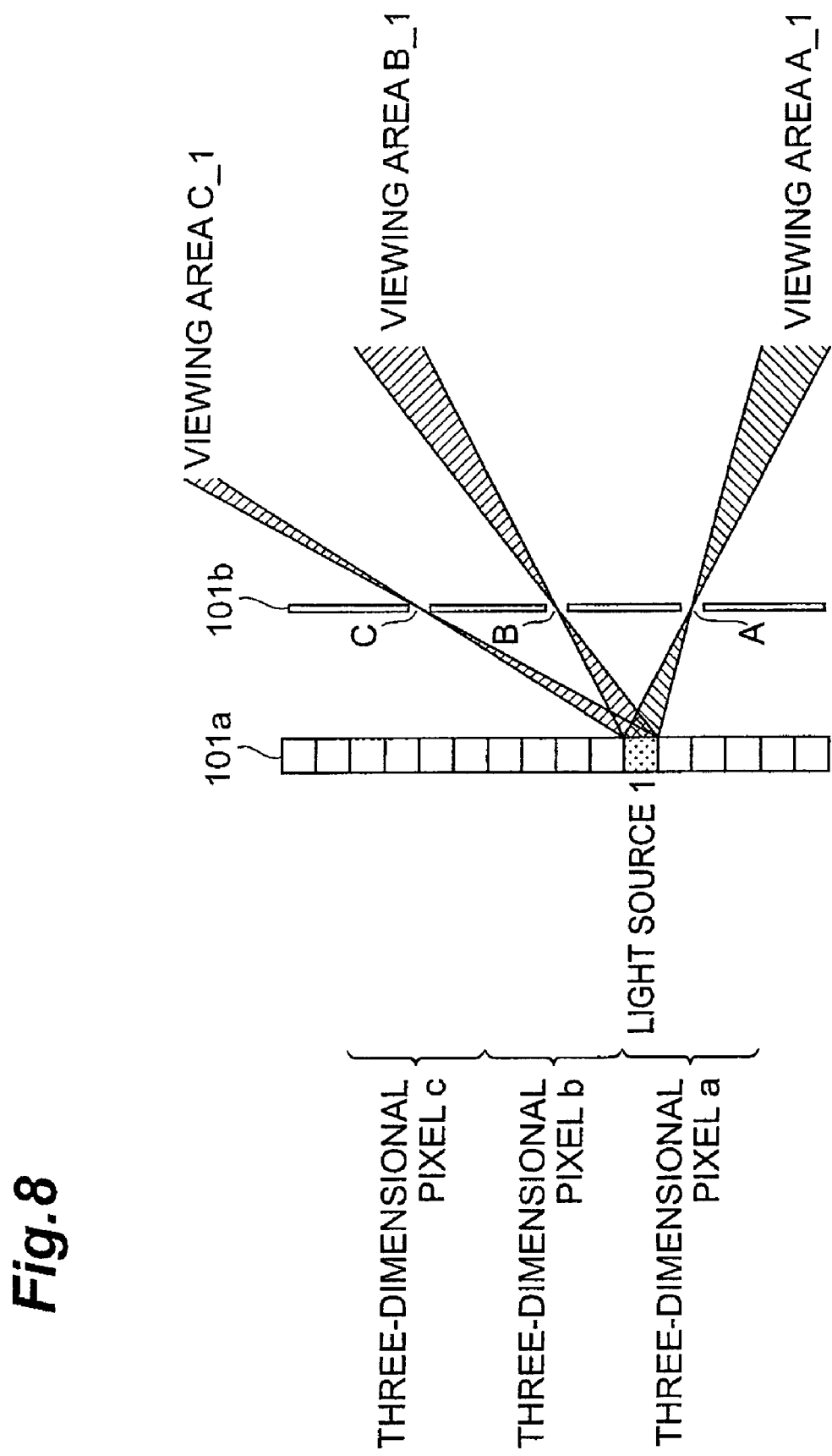
FIG. 8 is an explanatory drawing of a viewing area on the display using the parallax barrier.

The light beam control element 101b has slits A to C formed thereon, corresponding to 3D pixels a to c each of which composed of light sources 1 to 4, wherein respective light sources 1 to 4 are originally supposed to be observed through their corresponding slits A to C. As shown in FIG. 8, the light source 1 is one of the four light sources composing the 3D pixel a and is supposed to be observed through the slit A. In other words, when the observer is inside a area indicated by the viewing area A_1 of FIG. 8, the image from the light source 1 is observed by the observer through slit A just as supposed to be. This area will be referred to as a "normal viewing area" in the present embodiment.

On the other hand, if the observer moves to a line connecting the light source 1 and the slit B (viewing area B_1) or a line connecting the light source 1 and the slit C (viewing area C_1), the image emitted from the light source 1 is observed by the observer as a repetitive images. In the present embodiment, this area will be referred to as "repetitive area". Additionally, an area which is neither a normal viewing area nor a repetitive area will be referred to as a "shielded area" in the present embodiment, because the observer cannot observe the image from the light source 1 through any of the slits.

In the present embodiment, the terminal position detection sensor 102 and the observer position detection sensor 103 detect the observer's position relative to respective light sources 1 to 4. In other words, the terminal position sensor 102 and the observer position detection sensor 103 can calculate the combination of the positions of the terminal and the observer, or the relative positional relationship between the terminal and the observer. Based on respective positions of the display 101 and the observer output from the terminal position detection sensor 102 and the observer position detection sensor 103 or the relative positional relationship therebetween, the display image control device 104 can estimate which one of the areas relative to respective light sources 1 to 4 the observer is currently located within: the normal viewing area, the repetitive area, or the shielded area, and can control the information (image) to be displayed by the light source array 101*a*.

Figure 9:
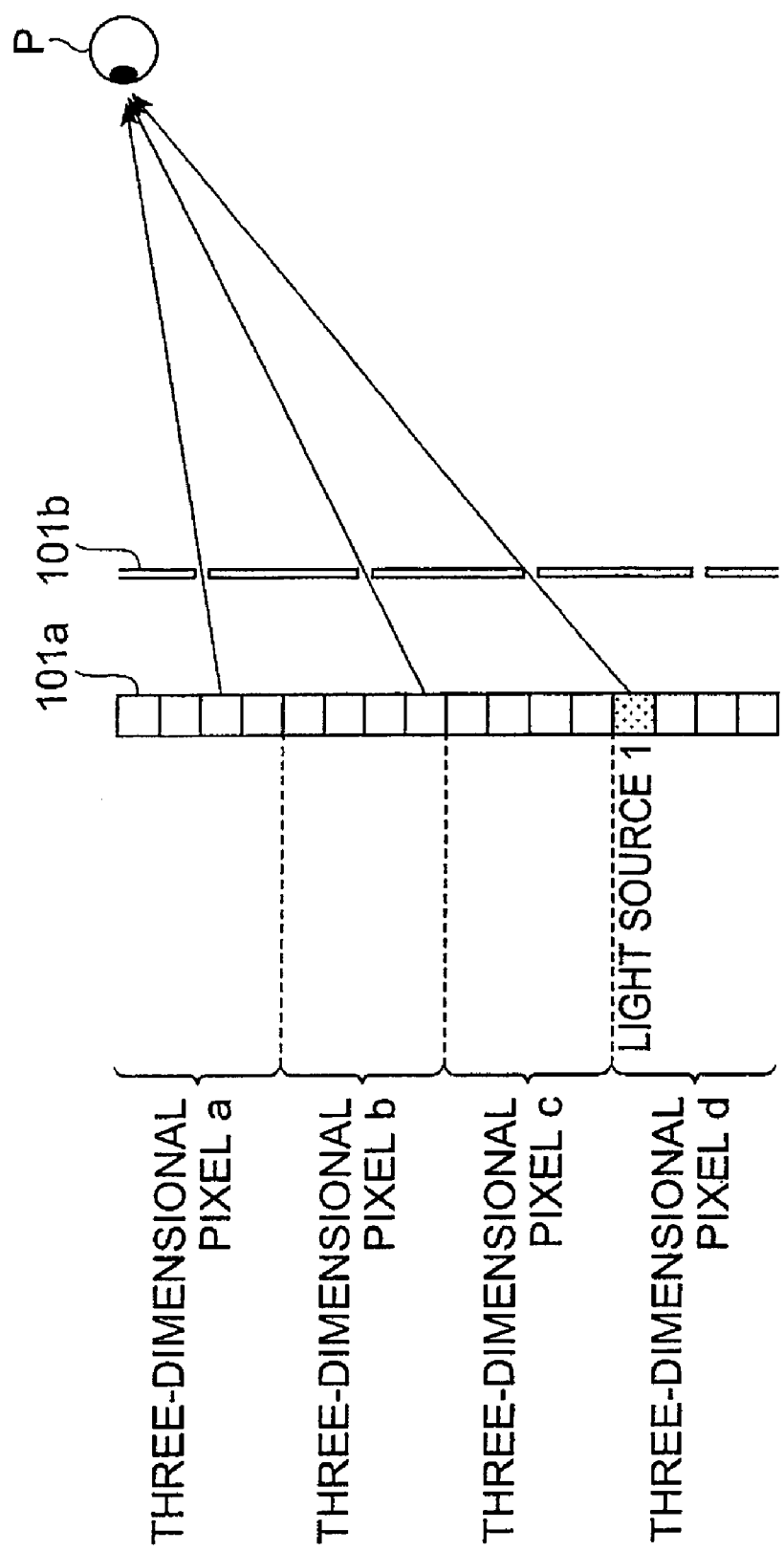
FIG. 9 is an explanatory drawing of generation of a repetitive image on the display using the parallax barrier.

A specific state will be described referring to FIGS. 9 and 10. As shown in FIG. 9, there is a case in which the display image control device 104 displays a view-dependent image as if it is a fifth light source (pixel) composing the 3D pixel c, for light source which should have formed a 3D pixel d. In this case, it happens that a repetitive image is viewed, or unnaturalness is sensed with the image. Therefore, as described below, the display image control device 104 controls the light source array 101*a* so as to execute a process without providing unnaturalness in the repetitive area, for all the light sources with the observer's position P being the repetitive area.

Here, as the control of information to be displayed on the light source generating the repetitive image, the display image control device 104 may execute a process of displaying nothing, that is, not turning on the light source, instead of displaying a new view-dependent image for the light source composing the adjacent 3D pixel. In this case, although there is no effect of expanding the viewing area, repetitive images will not be perceived which has been problematic in the past.

Details of the process will be described below. In the present embodiment, as described above, the display image control device 104 estimates the positional relationship between respective light sources composing the light source array 101*a* and the observer based on the positional information provided by the terminal position sensor 102 and the observer position detection sensor 103, and controls the information to be displayed for respective light sources in the light source array 101*a*. Here, the display image control device 104 switches the information to be provided to the light sources, according to the estimated positional relationship between the light sources and the observer.

Figure 10:
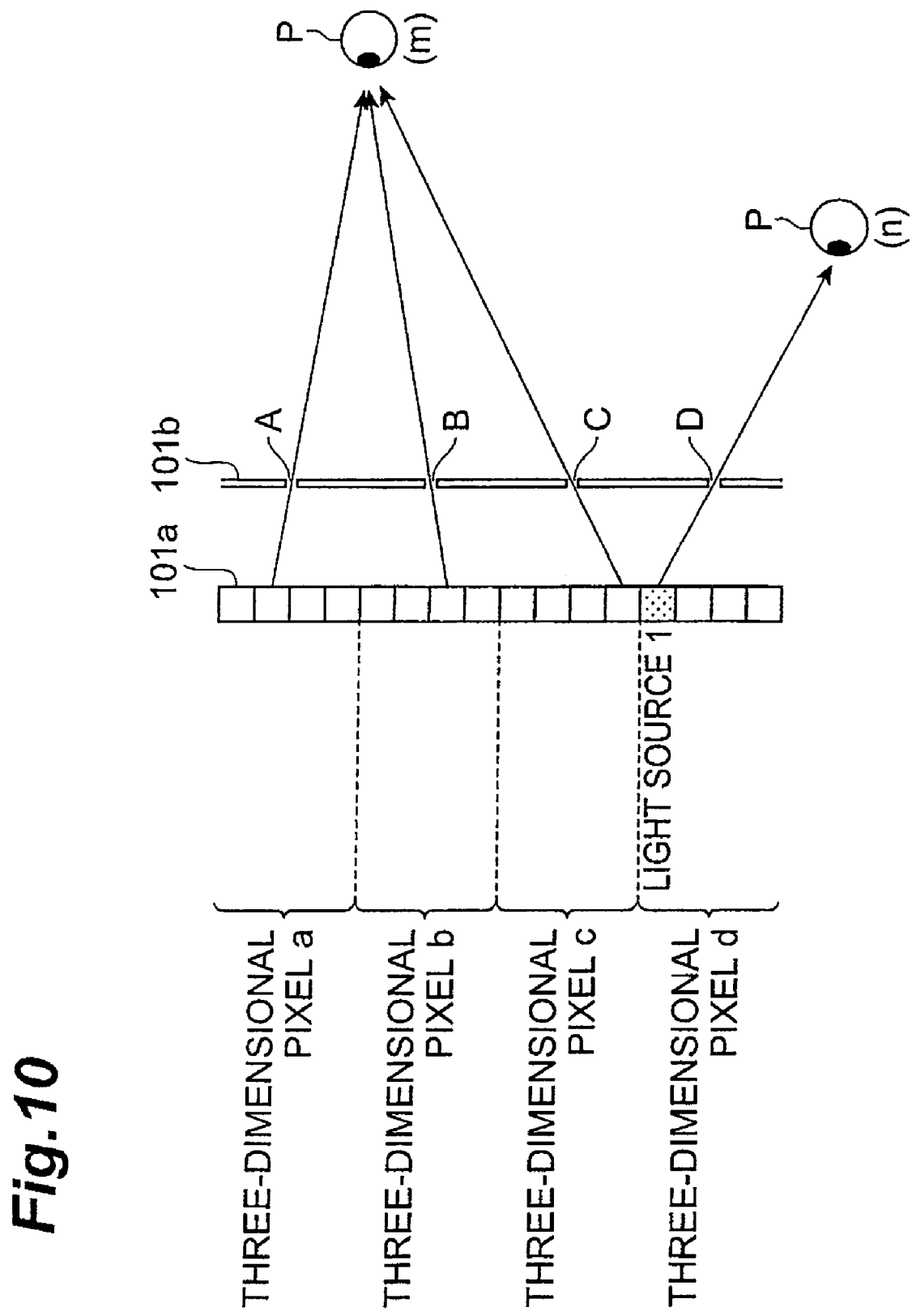
FIG. 10 is an explanatory drawing of displaying a normal image on the display using the parallax barrier.
Figure 11:
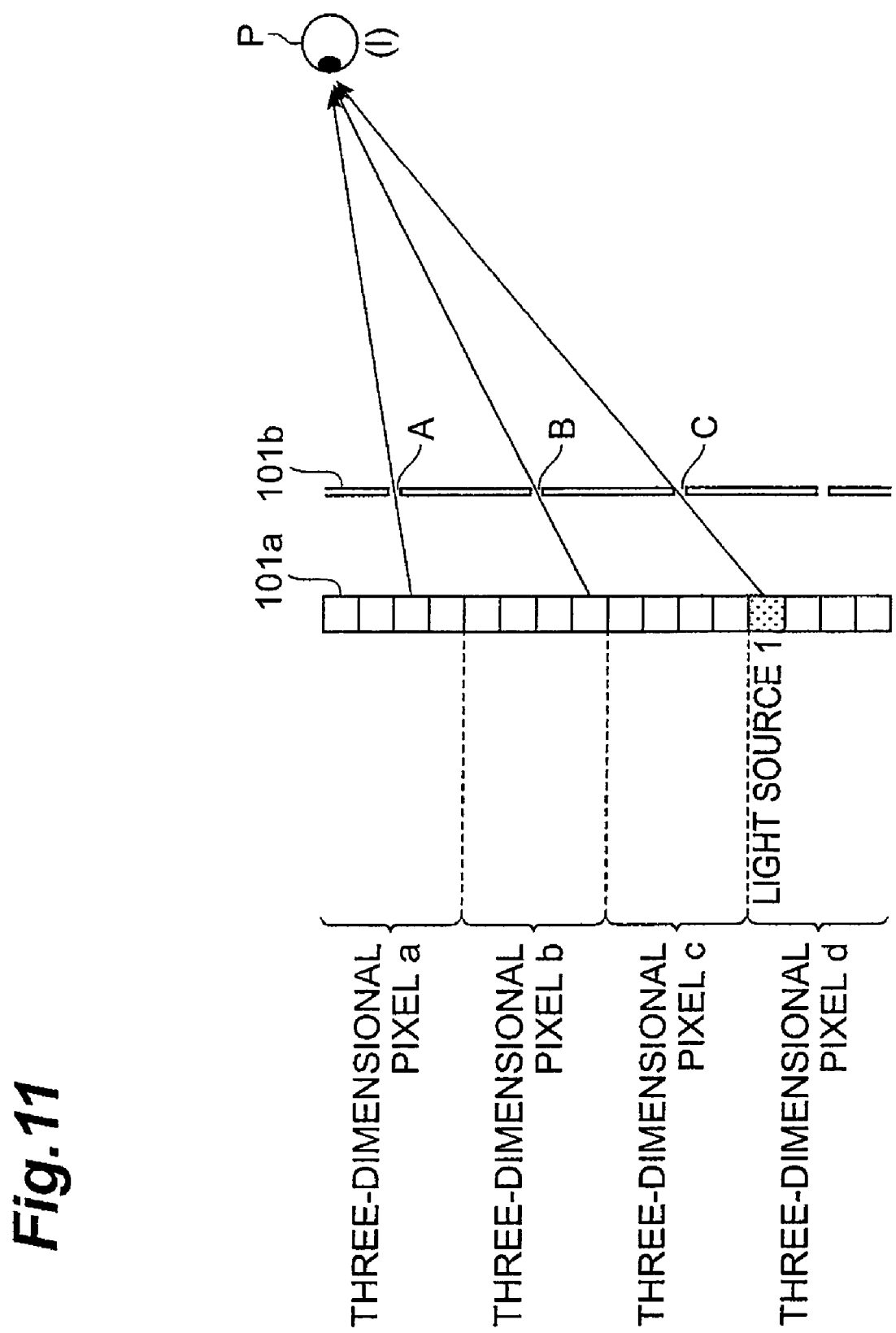
FIG. 11 is an explanatory drawing of displaying a normal image in place of the repetitive image on the display using the parallax barrier.

For example, consider such a case of FIG. 10. In the beginning, the observer P is located at a position (n) which is a normal viewing area for light source 1 and can observe the image formed by the light emitted from the light source 1. Subsequently, the observer P (his/her eye balls) moves to a position (m) shown in FIG. 10. Thus, the observer P is located in the normal viewing area for a light source emitting light which is the line of sight indicated by the arrow shown in FIG. 10, whereas the observer P is located in the shielded area for the light source 1. Up to here, the observer P does not perceive a repetitive image. If the observer P moves to a position (1) shown in FIG. 11 from this position (including the case in which the positional relationship between the display 101 and the observer has changed), the light source which can be observed through slit C is not one of the four light sources composing the original 3D pixel c, but the light source 1 composing the 3D pixel d adjacent to the 3D pixel c, whereby displaying a repetitive image.

In this occasion, the position (m) of the observer P shown in FIG. 10 is a shielded area for the light source 1 of the 3D pixel d, in which any change of the information to be provided to the light source 1 will not be perceived by the observer. In other words, when the observer is located in the position (m) shown in FIG. 10, the image to be displayed can be changed without letting the observer recognize that the display has been switched by preliminarily changing the information to be displayed by the light source 1, considering the possibility that observer may move. For example, the light source 1 is controlled so that an image for complementing the image can be output through slit C, based on the image from slits A and B, i.e., the light sources from which the light is emitted. In this manner it is possible to prevent displaying unnatural images to the observer, as well as increasing the images perceivable by the observer, whereby providing the observer with images that are easier to view.

Figure 12:
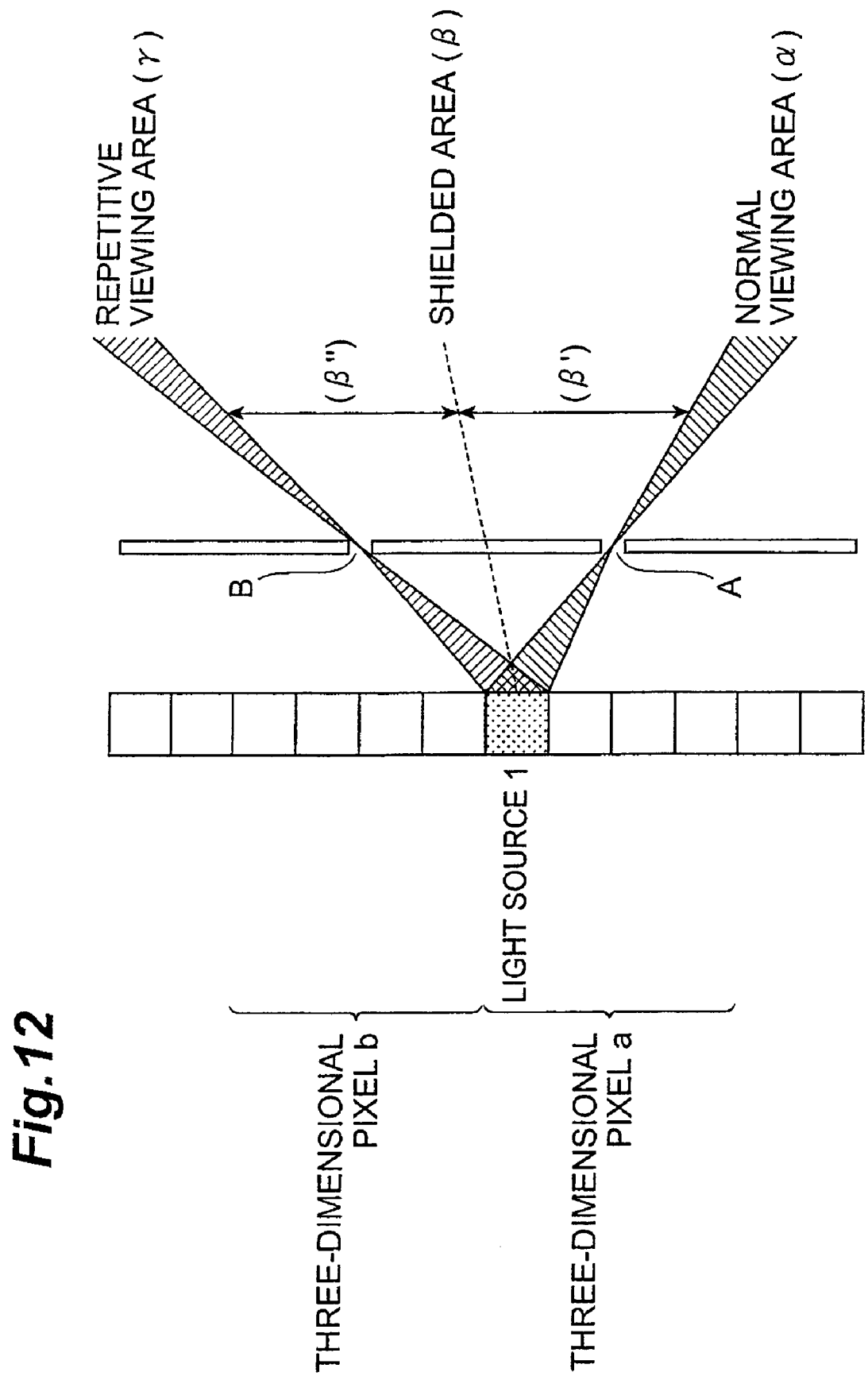
FIG. 12 is an explanatory drawing illustrating that the shielded area is bisected when executing image control on the display using the parallax barrier.

Here, the timing of changing the light to be emitted from the light source 1 is determined by the display image control device 104 executing the process shown in FIG. 12 on the light source within the shielded area.

The light source 1 shown in FIG. 12 is a light source designed under an assumption that observation is performed through slit A, with its normal viewing area being an area (α) in the drawing. In addition, there is a shielded area (β) above the area (α), and further thereabove is a repetitive area (γ) located at a position from where the light source 1 can be observed through slit B. Generally, the observing area of the light source usually has only one normal viewing area, with shielded areas on both sides thereof and repetitive areas on further both sides of the shielded areas, and from them on the shielded and repetitive areas appear alternately.

Now, bisecting the shielded area (β) defines an area (β') and an area (β''), based on which one of the areas they are closer to: the normal viewing area or the shielded area, existing on both sides (above and beneath, in the drawing) of the shielded area (β). When the observer is located inside the shielded area (β), the light source 1 cannot be observed through any of slits A or B. Therefore, the observer cannot perceive, if any, information being displayed, that is, if the light source array is a liquid crystal display, for example, regardless of whether the pixel corresponding to the light source 1 is turned on or off.

As thus described, making use of the condition in which the light source is not visible to the observer, the light source 1 composing the 3D pixel a is controlled so as to display the information as the 3D pixel a, since it is assumed that, when the observer is inside the area (β'), i.e., the shielded area close to the normal viewing area, the observer observes through slit A. If, otherwise, the observer is inside the area (β''), i.e., the shielded area close to the repetitive area, the light source 1 can be controlled so as to preliminarily display the information composing the 3D pixel b, whereby displaying a natural 3D image having a wide viewing area without letting the observer recognize unnaturalness of the image when the observer's position moves from the shielded area to the normal viewing area or the repetitive area.

Now a specific control method will be described below. The display image control device 104 determines, based on the positional information detected by the terminal position detection sensor 102 and the observer position detection sensor 103, respectively, which one of the areas (β') or (β'') the observer P is currently located, and may execute a control to change the image to be output at the light source 1. Here, whether the observer is in area (β') or area (β'') can be determined in the following manner: since the boundary between the area (β') and area (β'') is defined according to the relative positional relationship among the light source 1, slit A, and slit B, the display image control device 104 can determine that the observer is in the area (β') if the observer is located closer to the repetitive area (γ) than the boundary. If, on the other hand, the observer is located closer to the normal viewing area (α) than the boundary, the display image control device 104 can determine that the observer is in the area (β'').

Figure 13:
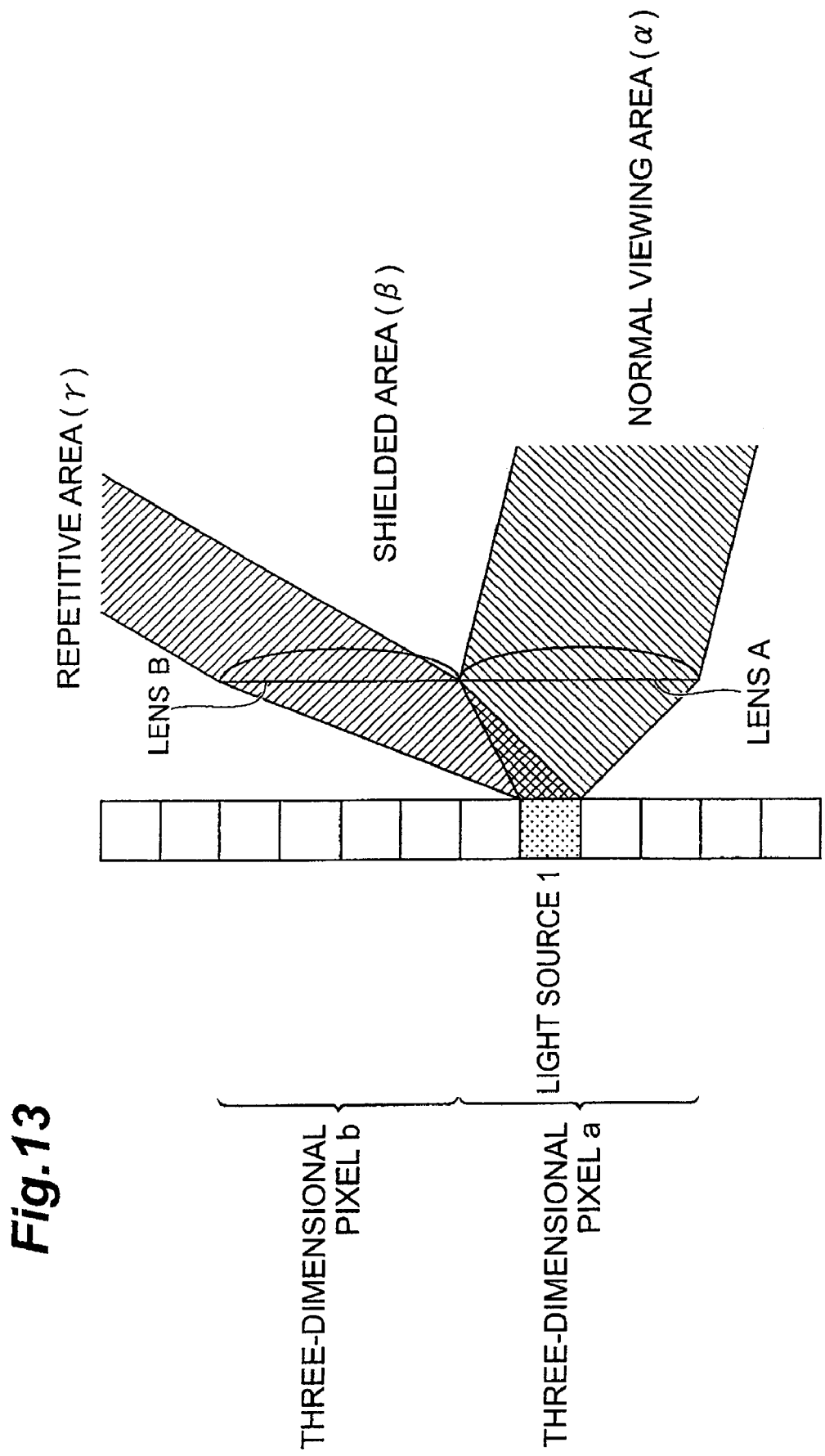
FIG. 13 is an explanatory drawing of the display using a cylindrical lens.

As stated above, the present embodiment provides the description basically assuming that the light beam control element 101*b* is a parallax barrier. However, even if the light beam control element 101*b* is a lens or a HOE, the normal viewing area, shielded area, and repetitive area can be similarly defined for respective light sources to realize the image display device in the present embodiment by executing a process similar to what has been described above. Next, an example of a normal viewing area, shielded area, and repetitive area for the horizontal direction will be described where the light beam control element 101b is a cylindrical lens. FIG. 13 is an explanatory drawing illustrating the normal viewing area, shielded area, and repetitive area when the light beam control element 101b uses a cylindrical lens.

In FIG. 13, the normal viewing area, repetitive area, and shielded area can be defined similarly for respective light sources, and the image display device of the present embodiment can be realized by a similar process with the only difference being that slit A and slit B are replaced by a cylindrical lens. Additionally, as stated above, on the other hand, the image display device of the present embodiment can be realized as long as an area in which the light source is visible and an area in which it is not visible can be generated with regard to the positional relationship between the light source and the observer.

In addition, only the normal viewing area, shielded area, and repetitive area are generated in the horizontal direction when the 3D display is a lenticular display, the normal viewing area and repetitive area may be similarly generated also in the vertical direction if usual lens array is used instead of a lenticular lens. In this case, the viewing area can be expanded for both the horizontal and vertical directions.

Now, an operation and effect of the image display device of the present embodiment will be described. An image display device 100 is designed such that the viewing area of the image formed by the light emitted from the light source array 101a is limited by the light beam control element 101b; the relative positional relationship between the observer's eyes observing the image composed of the light and the light source is detected by the terminal position detection sensor 102 and the observer position detection sensor 103; and display contents of the light composing the image with the limited viewing area can be changed by the display image control device 104 according to the detected positional relationship. In this manner, unnaturalness-free images can be displayed without showing the observer a repetitive image according to the observer's viewpoint.

Here, the light control element 101b may be a lenticular sheet having cylindrical lenses consecutively arranged thereon, or a parallax barrier having vertical slits periodically arranged thereon. In addition, a holographic optical element which can electrically control refractive index and amplitude transmittance may be used. Furthermore, a lens array of two-dimensionally arranged lenses may also be used.

Additionally, when the observer is located at a position other than a predefined normal viewing area (α), the image display device 100 can prevent outputting, from one light source, an image corresponding to the position within the normal viewing area (α) if it is determined that the observer is located at a position within a repetitive area (γ). In this manner, unnaturalness-free images can be displayed without showing the observer a repetitive image according to the observer's viewpoint.

In addition, if it is detected that the observer is located within a shielded area (β), the image display device 100 can prevent outputting, from one light source, an image corresponding to the position within the normal viewing area (α), assuring that repetitive images are not shown to the observer according to the observer's viewpoint, by preliminarily preventing output of the images.

In addition, if it is detected that the observer is located within the repetitive area (γ), the image display device 100 can cause light to be emitted from one source to complement the image created by the light emitted from other light source of the light source array 101a. In this manner, unnaturalness-free images can be shown, as well as increasing the images visible to the observer so that the observer is provided with images which are easier to view.

Second Embodiment

Figure 14:
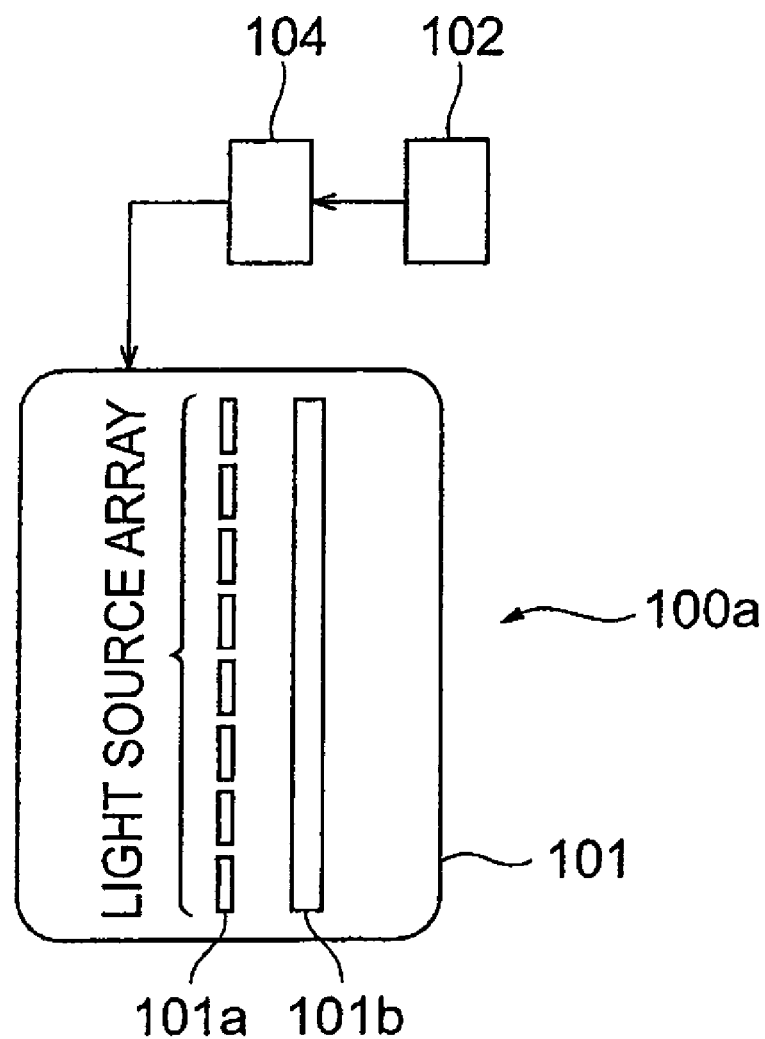
FIG. 14 is a block diagram illustrating the arrangement of an image display device of the second embodiment.

Next, the arrangement of an image display device according to a second embodiment will be described below. As shown in FIG. 14, the image display device 100a according to the second embodiment comprises a display 101 (including a light source array 101a and a light beam control element 101b), a terminal position detection sensor 102, and a display image control device 104. With the second embodiment, unlike the first embodiment, the display image control device 104 controls contents to be displayed on the light source array 101a depending only on the position of terminal without knowing the observer's position.

As with the first embodiment, the light source array 101a may be, for example, respective pixels of the liquid crystal display, or may be luminous bodies such as LEDs disposed.

As with the first embodiment, the light beam control element 101b may be a parallax barrier, an optical element such a cylindrical lens, or an optical element such as a holographic optical element (HOE).

As with the first embodiment, the terminal position detection sensor 102 may be an inclination sensor or an acceleration sensor attached to the display 101, or may be an infrared sensor, an ultrasonic sensor or an imaging device such as a camera. In addition, these sensors may be provided in external environment to detect the position, direction, or inclination of the display 101. The operation of the terminal position detection sensor 102, being similar to that described with regard to the first embodiment, detects the position of the display 101.

The display image control device 104 receives information of the terminal position detection sensor 102 and controls the information to be provided to the light source according to the received position of the display 101.

In the following, a specific method in which the display image control device 100a of the present embodiment controls the information to be provided to the light source will be described in comparison with the first embodiment.

In the first embodiment, the observer's position is detected by the observer position detection sensor 103, and it is determined, based on the relative relationship between the position of the display 101 acquired by the terminal position detection sensor 102 and the detected observer position, which one of the areas, relative to respective light sources, the observer is currently located within: the normal viewing area, the shielded area, or the repetitive area. With the present embodiment, the observer's position is preliminarily determined without using the observer position detection sensor 103, and the display image control device 104 estimates the position of the display 101 relative to the assumed position of the observer so as to estimate which one of the areas the observer is currently located within: the normal viewing area, the shielded area, or the repetitive area. As for the position of the observer to be preliminarily determined (assumed), the front direction may be facing the center of the display 101 and the distance may be determined based on the shape of the display 101 or the display content. In either case, the display image control device 104 can estimate the positional relationship between the display 101 and the observer based on the assumed observer's position, and the position and inclination of the display 101 acquired by the terminal position detection sensor 102, so that it can be determined which one of the areas the observer is currently located within: the normal viewing area, the shielded area, or the repetitive area.

Now, an operation and effect of the present embodiment will be described. With the present embodiment, it becomes possible, in addition to the operation and effect of the above-mentioned first embodiment, to detect the relative positional relationship between the observer and the displayed image by detecting the position of the light source as well as its inclination to the observer's line of sight or detecting either one thereof.

Third Embodiment

Figure 15:
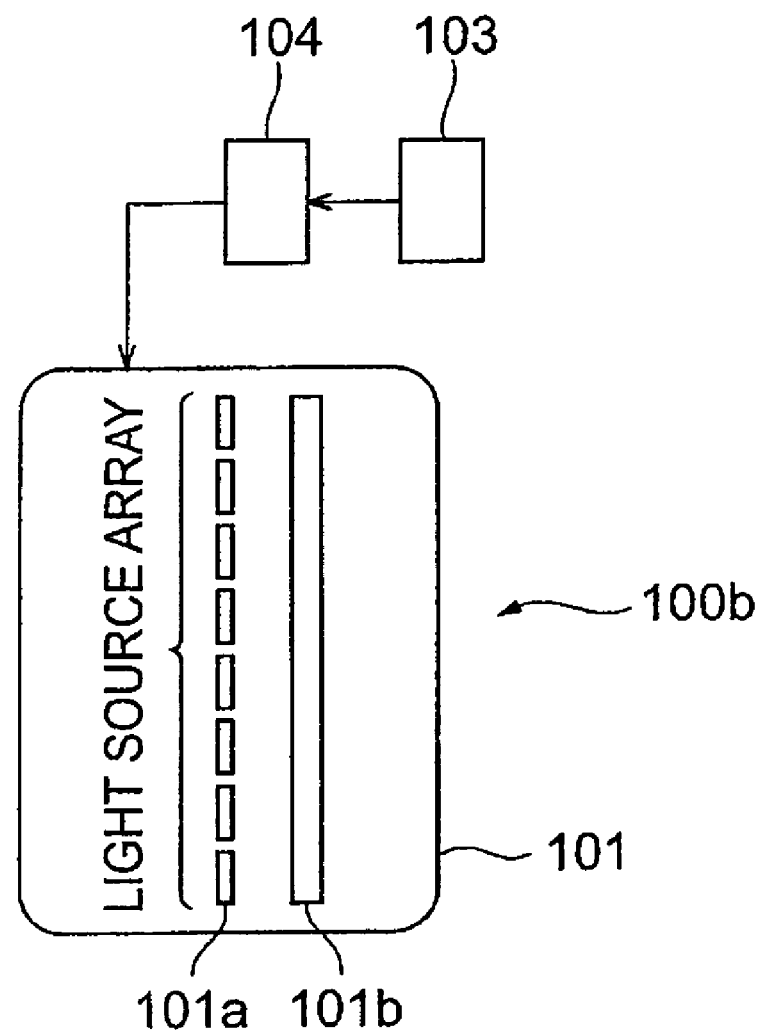
FIG. 15 is a block diagram illustrating the arrangement of an image display device of the third embodiment.

The arrangement of an image display device according to a third embodiment of the present invention will be described below. An image display device 100b comprises, as shown in FIG. 15, a light source array 101a, a light beam control element 101b, an observer position detection sensor 103, and a display image control device 104. With the image display device 100b of the present embodiment, unlike the first embodiment, the display image control device 104 controls contents to be displayed on the light source array 101a according to only the observer's position without detecting the position of the display 101.

The light source array 101a may be, as with the first embodiment, for example, respective pixels of the liquid crystal display, or may be luminous bodies such as LEDs disposed.

The light beam control element 101b may be, as with the first embodiment, a parallax barrier, an optical element such a cylindrical lens, or an optical element such as a holographic optical element (HOE).

The observer position detection sensor 103 may be, as with the first embodiment, an acceleration sensor, an infrared sensor, an ultrasonic sensor or a camera carried by the observer, or may be an infrared sensor, an ultrasonic sensor or camera provided on the display 101. Furthermore, it may be an infrared sensor, an ultrasonic sensor or a camera provided in the external environment. With regard to the operation of the observer position detection sensor 103, the observer's position, i.e., at least one of the eye position or line-of-sight direction (gaze direction) of the observer can be detected in a similar manner as described in the first embodiment.

The display image control device 104 receives the observer's positional information from the observer position detection sensor 103 and controls the information to be provided to the light source based on the received positional information.

In the following, a specific method of controlling the information which the display image control device 104 provides to the light source will be described in comparison with that of the first embodiment.

In the first embodiment, the position of the display 101 is detected by the terminal position detection sensor 102, and it is determined, based on the relative relationship between the observer's position acquired by the observer position detection sensor 103 and the detected position of the display 101, which one of the areas, relative to respective light sources, the observer is currently located within: the normal viewing area, the shielded area, or the repetitive area. With the present embodiment, the position of the display 101 is preliminarily determined (assumed) without using the terminal position detection sensor 102, and the observer's position relative to the assumed position of the display 101 can be estimated so as to estimate which one of the areas the observer is currently located within: the normal viewing area, the shielded area, or the repetitive area.

The position of the display 101 to be preliminarily assumed may be the front side facing the observer's initial position; or may be based on an assumption that the display 101 does not move after storing only the initial position of the display 101; or may be based on an assumption that the observer's line of sight is always focused on the center of the display 101. Here, when an infrared sensor, an ultrasonic sensor, or a camera provided on the display 101 is used as the observer position detection sensor 103, the display image control device 104 can correctly estimate the relative relationship between the display 101 and the observer's position without having to particularly assume the position of the display 101, since the observer's position to be detected is naturally the relative position of the observer to the display 101.

Employing any of the above methods, the positional relationship between the display 101 and the observer can be estimated according to the assumed position of the display 101 and the observer's position acquired by the observer position detection sensor 103, and whereby it can be determined which one of the areas the observer is currently located within: the normal viewing area, the shielded area, or the repetitive area, and the image display device 100b of the present embodiment can be realized by a similar process as with that described in the first embodiment.

Now an operation and effect of the present embodiment will be described. With the present embodiment, it becomes possible, in addition to the operation and effect of the above-mentioned first embodiment, to detect the relative positional relationship between the observer and the displayed image by detecting at least one of the eye position and line of sight of the observer who observes the displayed image.

What is claimed is:

1. An image display device comprising:
a light source unit having a plurality of light sources configured to emit light corresponding to a plurality of pixels composing an image to be displayed;
a light beam control unit configured to limit a viewing area of the image formed by the light emitted from the light source unit;
a detection unit configured to detect a relative positional relationship between an eye of an observer of the image, and the light source unit and the light beam control unit; and
an image control unit configured to control the light source unit in accordance with the positional relationship detected by the detection unit, the image control unit causing the light source unit to change display contents of the light forming the image with the viewing area limited by the light beam control unit,
wherein the image control unit prevents the light source unit from outputting an image emitted from at least one light source of the light source unit corresponding to a position within a predefined normal viewing area when the observer is located in a repetitive area, the repetitive area being a position other than a predefined normal viewing area where an image formed by the light emitted from the at least one light source of the plurality of light sources of the light source unit is visible, the control unit determining that the observer is located within a repetitive area based on information from the detection unit.

2. The image display device according to claim 1, wherein the light source unit uses a light source array to display an image.

3. The image display device according to claim 1, wherein the light beam control unit is a lenticular sheet having cylindrical lenses consecutively arranged thereon.

4. The image display device according to claim 1, wherein the light beam control unit is a parallax barrier having vertical slits periodically arranged thereon.

5. The image display device according to claim 1, wherein the light beam control unit is a liquid crystal lens or a holographic optical element (HOE) which can electrically control refractive index and amplitude transmittance.

6. The image display device according to claim 1, wherein the light beam control unit is a lens array consisting of two-dimensionally arranged lenses.

7. The image display device according to claim 1, wherein the detection unit detects at least one of a position of a display unit including the light source unit, an inclination of the display unit with respect to a gaze direction of the observer, and the position of the eyes and the gaze direction of the observer observing the image displayed by the display unit.

8. The image display device according to claim 1 wherein the image control unit controls the light source unit, when the detection unit detects that the observer is located within a shielded area in which light emitted from the one light source is not visible, so that the light source unit does not output an image to be emitted from the light source unit to the normal viewing area.

9. The image display device according to claim 8 wherein the image control unit controls the light source unit, when the detection unit detects that the observer is located at a position within the repetitive area for the one light source, so that light is emitted from the one light source to complement the image formed by the light emitted from other light sources having the position within the normal viewing area.

10. The image display device according to claim 1, wherein the light beam control unit is provided on a display surface of the light source unit.

11. The image display device according to claim 1, wherein the detection unit includes a terminal position detection sensor configured to detect the position of a display unit, and an observer position detection sensor configured to detect the position of the observer.

12. The detection unit according to claim 11, wherein the terminal position detection sensor specifies the position of the display unit by three coordinate axes in space, the terminal position detection sensor being capable of detecting a location of the display unit at a point along the coordinate axes and a display unit facing direction.

13. The detection unit according to claim 11, wherein the observer position detection sensor specifies the position of the observer as a coordinate value relative to the three coordinate axes.

14. The image display device according to claim 1, wherein the image control unit inhibits image output by the light source unit to the normal viewing area, when the detection unit detects an observer position within a repetitive area.

15. The image display device according to claim 1, wherein the image control unit causes the light source to output an image corresponding to a position within the normal viewing area, when the detection detects an observer position within a shielded area but closer to the normal viewing area.

16. The image display device according to claim 1, wherein the image control unit causes the light source unit to output light from one light source to complement the image formed by light emitted from other light sources having a position within the normal viewing area, when the detection unit detects an observer position within a shielded area but closer to a repetitive area.

17. An image display method of an image display device, comprising:
- emitting light from a light source unit having a plurality of light sources, the light corresponding to a plurality of pixels composing an image to be displayed;
- limiting a viewing area of the image formed by the light emitted from the light source unit using a light beam control unit;
- detecting a relative positional relationship between an eye of an observer of the image, and the light source unit and the light beam control unit; and
- controlling the light source unit in accordance with the positional relationship detected by the detection step and causing the light source unit to change display contents of the light forming the image with the viewing area limited by the light beam control unit including,
- preventing the light source unit from outputting an image emitted from at least one light source of the light source unit corresponding to a position within a predefined normal viewing area when the observer is located in a repetitive area, the repetitive area being a position other than a predefined normal viewing area where an image formed by the light emitted from the at least one light source of the plurality of light sources of the light source unit is visible, the control unit determining that the observer is located within a repetitive area based on information from the detection step.

* * * * *